United States Patent
Simon

(10) Patent No.: US 9,785,132 B2
(45) Date of Patent: Oct. 10, 2017

(54) TARGET SIGNATURE CLOSED LOOP CONTROL SYSTEM AND METHOD

(71) Applicant: Emhart Glass S.A., Cham (CH)

(72) Inventor: Jonathan S. Simon, Pleasant Valley, CT (US)

(73) Assignee: Emhart Glass S.A., Cham (CH)

( * ) Notice: Subject to any disclaimer, the term of this patent is extended or adjusted under 35 U.S.C. 154(b) by 810 days.

(21) Appl. No.: 14/074,260

(22) Filed: Nov. 7, 2013

(65) Prior Publication Data

US 2015/0127134 A1    May 7, 2015

(51) Int. Cl.
| | |
|---|---|
| C03B 9/41 | (2006.01) |
| G05B 19/04 | (2006.01) |
| G05B 19/042 | (2006.01) |
| G05B 19/418 | (2006.01) |
| G06T 7/00 | (2017.01) |

(52) U.S. Cl.
CPC ....... *G05B 19/0405* (2013.01); *G05B 19/042* (2013.01); *G05B 19/41875* (2013.01); *G06T 7/001* (2013.01); *G05B 2219/25391* (2013.01); *G05B 2219/2635* (2013.01); *G05B 2219/42036* (2013.01); *G05B 2219/42058* (2013.01); *G05B 2219/42307* (2013.01); *G06T 2207/10024* (2013.01); *Y02P 90/22* (2015.11)

(58) Field of Classification Search
None
See application file for complete search history.

(56) References Cited

U.S. PATENT DOCUMENTS

| | | | |
|---|---|---|---|
| 6,584,805 B1 * | 7/2003 | Burns | C03B 9/41 209/524 |
| 8,462,203 B2 | 6/2013 | Holtkamp et al. | |
| 2008/0013821 A1 | 1/2008 | MacGregor | |
| 2011/0141265 A1 | 6/2011 | Holtkamp et al. | |
| 2012/0211331 A1 | 8/2012 | Simon | |
| 2012/0226378 A1 * | 9/2012 | Simon | G05B 19/41875 700/157 |
| 2013/0178952 A1 | 7/2013 | Wersborg et al. | |
| 2015/0076353 A1 * | 3/2015 | Bathelet | B07C 5/3408 250/340 |

FOREIGN PATENT DOCUMENTS

EP    2 336 740    6/2011

* cited by examiner

*Primary Examiner* — Mohammad Ali
*Assistant Examiner* — Md Azad
(74) *Attorney, Agent, or Firm* — Reinhart Boerner Van Deuren P.C.

(57) ABSTRACT

A system and a method for improving process yield and quality while reducing dependence on operator skill by automatically adjusting I.S. machine timing and motions. Container pixel data information indicative of certain measurements of hot glass containers manufactured by the I.S. machine obtained with a multipoint, multispectral glass container measurement system is mathematically transformed into a reduced dimensional measured signature. Event timing signals to operate the cavities of the section of the I.S. machine in response to the measured signature and a preferred target signature are produced to automatically adjust the event timing of operations in the cavities of the section of the I.S. machine to diminish variations in the measured signature.

17 Claims, 5 Drawing Sheets

TARGET SIGNATURE CLOSED LOOP CONTROL SYSTEM AND METHOD

BACKGROUND OF THE INVENTION

Field of the Invention

The present invention relates generally to the operation of an individual section machine (hereinafter an "I.S. machine") and more particularly to improving process yield and quality while reducing dependence on operator skill by automatically adjusting I.S. machine timing and motions.

A system and method for monitoring hot glass containers at the hot end as they stream from an I.S. machine manufacturing them is disclosed in European Patent Application Publication No. EP 2 336 740 A1, to Holtkamp et al., entitled "Method and System for Monitoring and Controlling a Glass Container Forming Process," in U.S. Pat. No. 8,462,203, to Holtkamp et al., entitled "Method and System for Monitoring and Controlling a Glass Container Forming Process," and in U.S. Patent Application Publication No. US 2011 0141265 A1, to Holtkamp et al., entitled "System and Method for Monitoring Hot Glass Containers to Enhance Their Quality and Control the Forming Process," all three of which are assigned to the assignee of the present patent application, and all three of which are hereby incorporated herein by reference in their entirety.

While these systems and methods enable the quality of hot glass containers manufactured by an I.S. machine to be monitored, it would be beneficial to use the large amount of information available on the characteristics of the hot glass containers provided by these systems and methods to further enhance the quality of the hot glass containers being manufactured by the I.S. machine. In this regard, it would be beneficial to use some of the information regarding the characteristics of the hot glass containers provided by these systems and methods to automatically control the operation of the I.S. machine to further enhance the quality of the hot glass containers being produced.

In general, automatic adjustment of the machine to maintain glass distribution based upon the information available on the characteristics of the hot glass containers has not been accomplished in the past, and would thus represent a new development. Fundamentally, the best glass distribution will be achieved when the operating conditions of the I.S. machine are closest to the conditions for which the parison/blank molds have been designed. If conditions change, the glass distribution may also be impacted.

It will thus be appreciated that it would be desirable to provide a system and method to improve process yield and quality while reducing dependence on operator skill by automatically adjusting I.S. machine timing and motions.

The subject matter discussed in this background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions.

SUMMARY OF THE INVENTION

The disadvantages and limitations of the background art discussed above are overcome by the present invention. With this invention, a system and a method improve process yield and quality while reducing dependence on operator skill by automatically adjusting I.S. machine timing and motions. Container pixel data information indicative of certain measurements of hot glass containers manufactured by the I.S. machine obtained with a multipoint, multispectral glass container measurement system is mathematically transformed into a reduced dimensional measured signature. Event timing signals to operate the cavities of the section of the I.S. machine in response to the measured signature and a preferred target signature are produced to automatically adjust the event timing of operations in the cavities of the section of the I.S. machine to diminish variations in the measured signature.

In a system embodiment, a system for automatically adjusting the event timing of operations in cavities of a section of an I.S. machine includes: a multipoint, multispectral glass container measurement system that provides container pixel data information indicative of certain measurements of hot glass containers manufactured by the I.S. machine; a signature extraction block that mathematically transforms container pixel data information into a reduced dimensional measured signature; and a controller for producing event timing signals to operate the cavities of the section of the I.S. machine in response to the measured signature and a preferred target signature to automatically adjust the event timing of operations in the cavities of the section of the I.S. machine to diminish variations in the measured signature.

In another system embodiment, a system for automatically adjusting the event timing of operations in cavities of a section of an I.S. machine includes: a multipoint, multispectral glass container measurement system that is arranged to monitor radiation emitted by hot glass containers after they are formed and before they are cooled as they are conveyed away from the I.S. machine, wherein the container measurement system provides container pixel data information indicative of certain measurements of hot glass containers manufactured by the I.S. machine; a signature extraction block that mathematically transforms container pixel data information into a reduced dimensional measured signature; an element for providing a preferred target signature known to have previously provided desirable hot glass containers; and a controller for producing event timing signals to operate the cavities of the section of the I.S. machine in response to the measured signature and a preferred target signature to automatically adjust the event timing of operations in the cavities of the section of the I.S. machine to diminish variations in the measured signature.

In a method embodiment, the event timing of operations in the cavities of a section of an I.S. machine is automatically adjusted by steps including: providing container pixel data information indicative of certain measurements of hot glass containers manufactured by the I.S. machine with a multipoint, multispectral glass container measurement system; mathematically transforming container pixel data information into a reduced dimensional measured signature; and producing event timing signals to operate the cavities of the section of the I.S. machine in response to the measured signature and a preferred target signature to automatically adjust the event timing of operations in the cavities of the section of the I.S. machine to diminish variations in the measured signature.

The target signature closed loop control system of the present invention provides a system and a method to improve process yield and quality while reducing dependence on operator skill by automatically adjusting I.S.

machine timing and motions. The target signature closed loop control system and method of the present invention achieves numerous advantages without incurring any substantial relative disadvantage.

DESCRIPTION OF THE DRAWINGS

These and other advantages of the present invention are best understood with reference to the drawings, in which.

DETAILED DESCRIPTION OF AN EXEMPLARY EMBODIMENT

Figure 1:
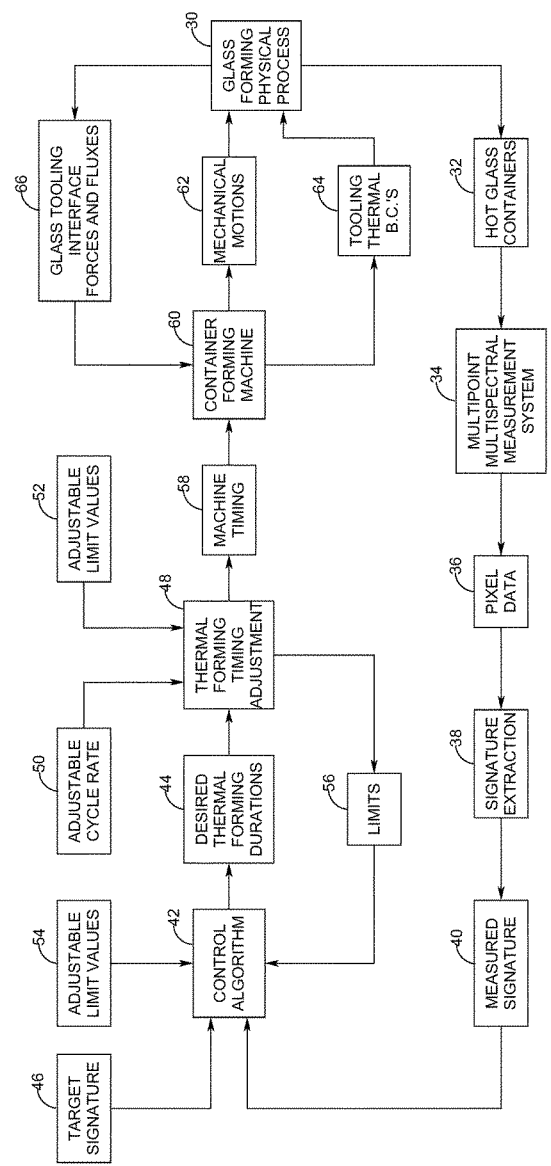
FIG. 1 is a functional schematic depiction of a target signature closed loop control system implementing a first embodiment of the present invention.

The proposed invention utilizes a feedback control loop, an implementation of which is illustrated schematically in FIG. 1. A glass forming physical process 30 creates hot glass containers 32. The electromagnetic (EM) energy radiated from, reflected off, or transmitted through the hot glass containers 32 are detected by a multipoint, multispectral measurement system 34, which provides pixel data 36 collectively representing each hot glass container 32 passing the multipoint, multispectral measurement system 34, which pixel data 36 provide a multipoint measurement of each hot glass container 32. The measurement may for example be made using an area or line scan camera that is sensitive in the infrared and visible portions of the EM spectrum. The pixel data 36 corresponds to the measurement emanating from various points of each hot glass container 32 and/or its immediate surroundings, and this set of m individual pixel values is represented as the m-dimensional vector, x.

The multipoint, multispectral measurement system 34 may be as described in European Patent Application Publication No. EP 2 336 740 A1, U.S. Pat. No. 8,462,203, and U.S. Patent Application Publication No. US 2011 0141265 A1, all of which were incorporated herein by reference in their entirety above. The multipoint, multispectral measurement system 34 is arranged and configured to monitor radiation emitted by the hot glass containers 32 after they are formed and before they are cooled as they are conveyed away from the I.S. machine. The multipoint, multispectral measurement system 34 includes at least one imaging device for monitoring radiation emitted by the hot glass containers 32 after they are formed and as they are conveyed away from the I.S. machine.

This pixel data vector x is then mathematically transformed in a signature extraction block 38 to produce a measured signature 40, which may be an r-dimensional vector t(x). The length (number of dimensions) r is typically less than m (as discussed subsequently). There are many possible choices for the mathematical transformation accomplished in the signature extraction block 38, but the general purpose is to provide a reduced dimensional (relative to the original number of pixels) set of values that are correlated with undesirable variations in the hot glass containers 32.

The technique that may be used by the signature extraction block 38 for this purpose may be Principle Component Analysis (a mathematical procedure that uses orthogonal transformation to convert a set of observations of possibly correlated variables into a set of values of linearly uncorrelated variables called principal components), or through the use of Partial Least Squares regression (a statistical method that finds a linear regression model by projecting the predicted variables and the observable variables to a new space). Both of these approaches will be discussed in detail below. The set of values contained in t(x) will be referred to as the measured signature 40. It may be understood that if the variations in the measured signature 40 t(x) can be diminished, then undesirable variations in the hot glass containers 32 will also be reduced.

To accomplish the desired reduction in variability of the measured signature 40 t(x), the measured signature 40 t(x) for each hot glass container is fed back to a control algorithm 42, which computes adjustments to desired thermal forming durations 44 the purpose of which is to maintain value of t(x) as close as possible to a preferred signature setpoint 46 $t(x)_{target}$ for the signature setpoint. The preferred signature setpoint 46 could be chosen, for example, as a value that had previously provided desirable hot glass containers 32.

In order to maintain the measured signature t(x) close to $t(x)_{target}$, the control algorithm 42 computes the desired thermal forming durations 44 u (e.g. mold contact time, stretch time, blank contact time) to be applied to the I.S. machine. The thermal forming durations 44 u denotes a length $N_u$ vector of values, where $N_u$ is the number of adjusted values. Many different control algorithms could be used to actually compute the adjustment values. One possibility is to utilize multiple individual Proportional-Integral-Derivative ("PID") control loops with particular process inputs tied to particular elements of the signature vector. A Multiple-Input, Multiple-Output ("MIMO") controller could also be used to account for coupling between the variables. As will be discussed below, one attractive algorithm for this purpose would be a form of what is known in the control literature as internal model control, in which an approximate process model is utilized in the computation of the process adjustments.

Since in general multiple interrelated changes must be made to the timing of the machine events in order to achieve the desired changes in thermal forming duration, a thermal forming timing adjustment block 48 is used to compute the required detailed timing adjustments. In general, due to constraints of available cycle time, timing sequence requirements, and mechanical interference, it may not be possible to exactly achieve the desired thermal forming durations 44. It is the function of the thermal forming timing adjustment block 48 to approximate the desired values within allowable constraints.

Constraints may be derived from externally set inputs such as a cycle rate 50 or other adjustable limits 52, or they may be computed using a process model together with data for this process model, which may be contained within the thermal forming timing adjustment block 48. The computations within the thermal forming timing adjustment block 48 may take different forms, and may for example include an optimization as discussed within U.S. Pat. Nos. 7,489,983, 6,722,158, 6,711,916, 6,705,120, 6,705,119, 6,606,886, 6,604,386, 6,604,385, 6,604,384, and 6,604,383, which are all assigned to the assignee of the present patent application, and which are all hereby incorporated herein by reference. Since it may be advantageous for the control algorithm 42 to be aware of constraint values, so as to cause the control algorithm 42 to stay within the allowed limits, these limit values can be communicated to the control algorithm 42 either directly as adjustable limit values 54, or as limits 56 outputted from the thermal forming timing adjustment block 48.

The thermal forming timing adjustment block 48 provides machine timing signals 58 to operate a container forming machine 60. The container forming machine 60 produces mechanical motions 62 which implement the glass forming physical process 30. Also affecting the glass forming physical process 30 are tooling thermal boundary conditions 64. Finally, the glass forming physical process 30 causes glass-tooling interface forces and fluxes 66 which affect the operation of the container forming machine 60.

With regard to the dimensions m, r, and $N_u$ of the pixel data vector, the signature vector, and the process adjustment vector, respectively, it may be noted that in general the number of quantities that can be controlled is limited by the number of adjustable process inputs. That is, we cannot control more than $N_u$ quantities. Therefore, a key aspect of the signature extraction process is to reduce the original m dimensions of pixel data which will generally be greater than $N_u$ down to a smaller number of relevant values that can be controlled with the available number of inputs. In general, it will be required that r is less than or equal to $N_u$. The number of adjustable inputs $N_u$ is limited by the desired complexity of the control (it may be undesirable to adjust more than a few variables) and also the number of effective control inputs. That is, if there are only a few essential process adjustments that actually effect what we care about in the process, then it isn't beneficial to adjust additional variables.

Figure 2:
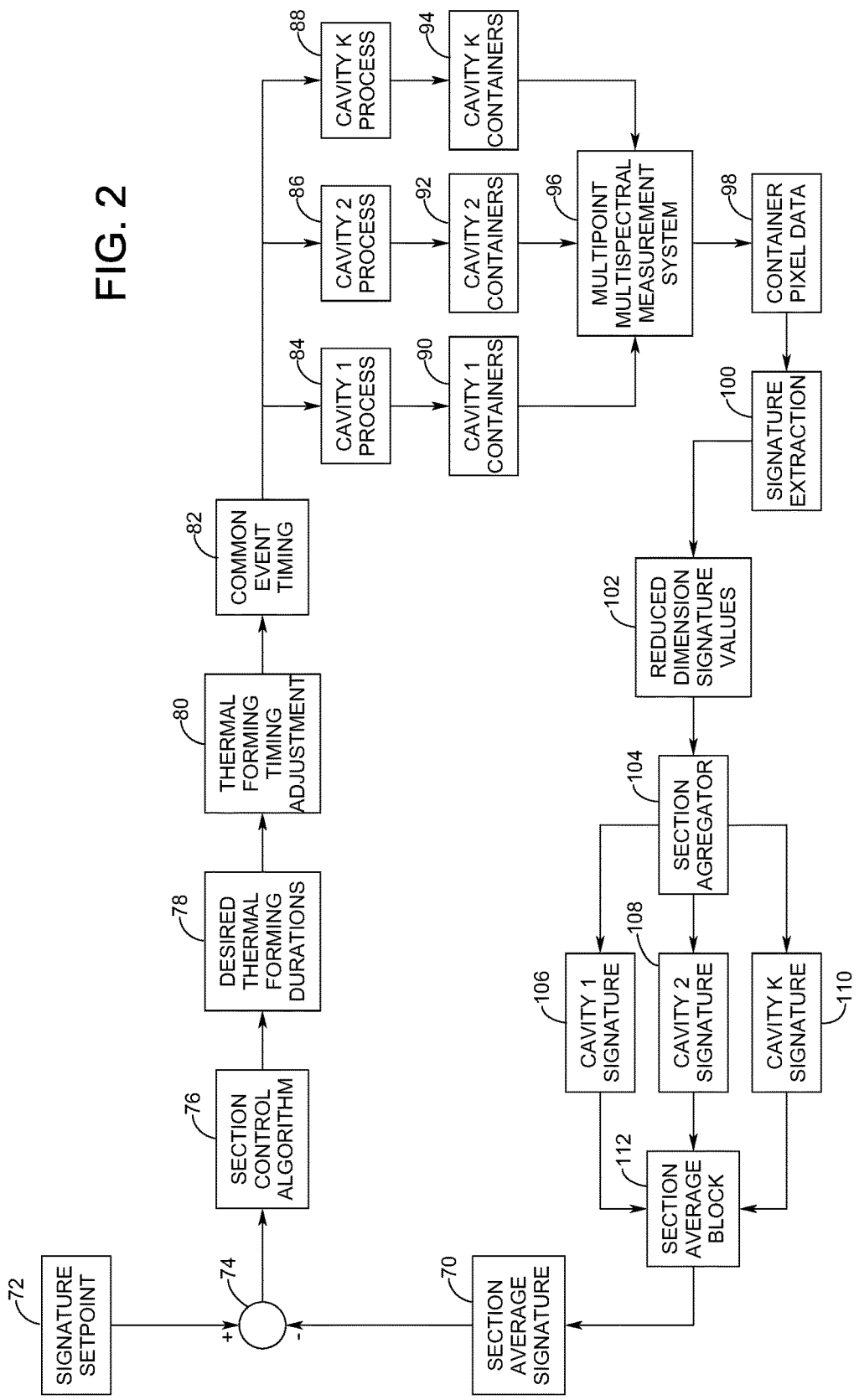
FIG. 2 is a functional schematic depiction of a section average closed loop control system implementing a second embodiment of the present invention.

The target signature closed loop control system shown in FIG. 1 provides a high level view of the overall control system for an I.S. machine. In fact, the overall I.S. machine is made of multiple sections, and the overall structure shown in FIG. 1 could be implemented as a set of independent control loops for each section (except if I.S. machine speed control is varied, which would be applicable to the entire I.S. machine). Such a section average control structure is shown in the functional schematic of FIG. 2. Referring now to FIG. 2, this operation can be described as follows. A section average signature 70 is subtracted from a signature setpoint 72 by a summer 74. The resulting error signal is fed to a section control algorithm 76.

The section control algorithm 76 computes a set of desired thermal forming durations 78 that are input to a thermal forming timing adjustment system 80. The thermal forming timing adjustment system 80 computes common event timing values 82 for the section. This set of common event timing values 82 is applied to the section. The section, typically produces multiple streams of containers. If there are k mold cavities on the blank side, and k mold cavities on the blow side, we will consider the overall section to be made up of k subprocesses each producing a stream of containers that we designate here as a cavity 1 process 84, a cavity 2 process 86, up to a cavity k process 88. The hot containers from each of the cavity 1 process 84, the cavity 2 process 86, and the cavity k process 88, which are respectively shown as cavity 1 containers 90, cavity 2 containers 92, and cavity k containers 94 are placed onto a flight conveyor (not shown herein) where they, along with the hot containers from the other sections not shown in FIG. 2, pass a multipoint, multispectral measurement system 96.

As was the case in the system shown in FIG. 1, the multipoint, multispectral measurement system 96 shown in FIG. 2 may be as described in European Patent Application Publication No. EP 2 336 740 A1, U.S. Pat. No. 8,462,203, and U.S. Patent Application Publication No. US 2011 0141265 A1, all of which were incorporated herein by reference in their entirety above.

The multipoint, multispectral measurement system 96 produces a serial stream of container pixel vectors 98 corresponding to the passing containers. These container pixel vectors 98 are sent to a signature extraction block 100 that transforms the pixel vector from each container to a corresponding reduced dimension signature value 102 vector. The stream of reduced dimension signature values 102 (one for each hot container that has passed the multipoint, multispectral measurement system 96) is provided as an input to a section aggregator 104. The section aggregator 104 collects together the reduced dimension signature values 102 corresponding to the last measured machine cycle's production from a given section, and outputs k signature vectors shown as a cavity 1 signature 106, a cavity 2 signature 108, and a cavity k signature 110, respectively corresponding to the first cavity, the second cavity, up to the kth cavity representing the last measured cycle's production from a given section. The set of k signature vectors including the cavity 1 signature 106, the cavity 2 signature 108, and the cavity k signature 110 is then averaged by a section averaging block 112 to produce the section average signature 70, completing the loop.

Figure 3:
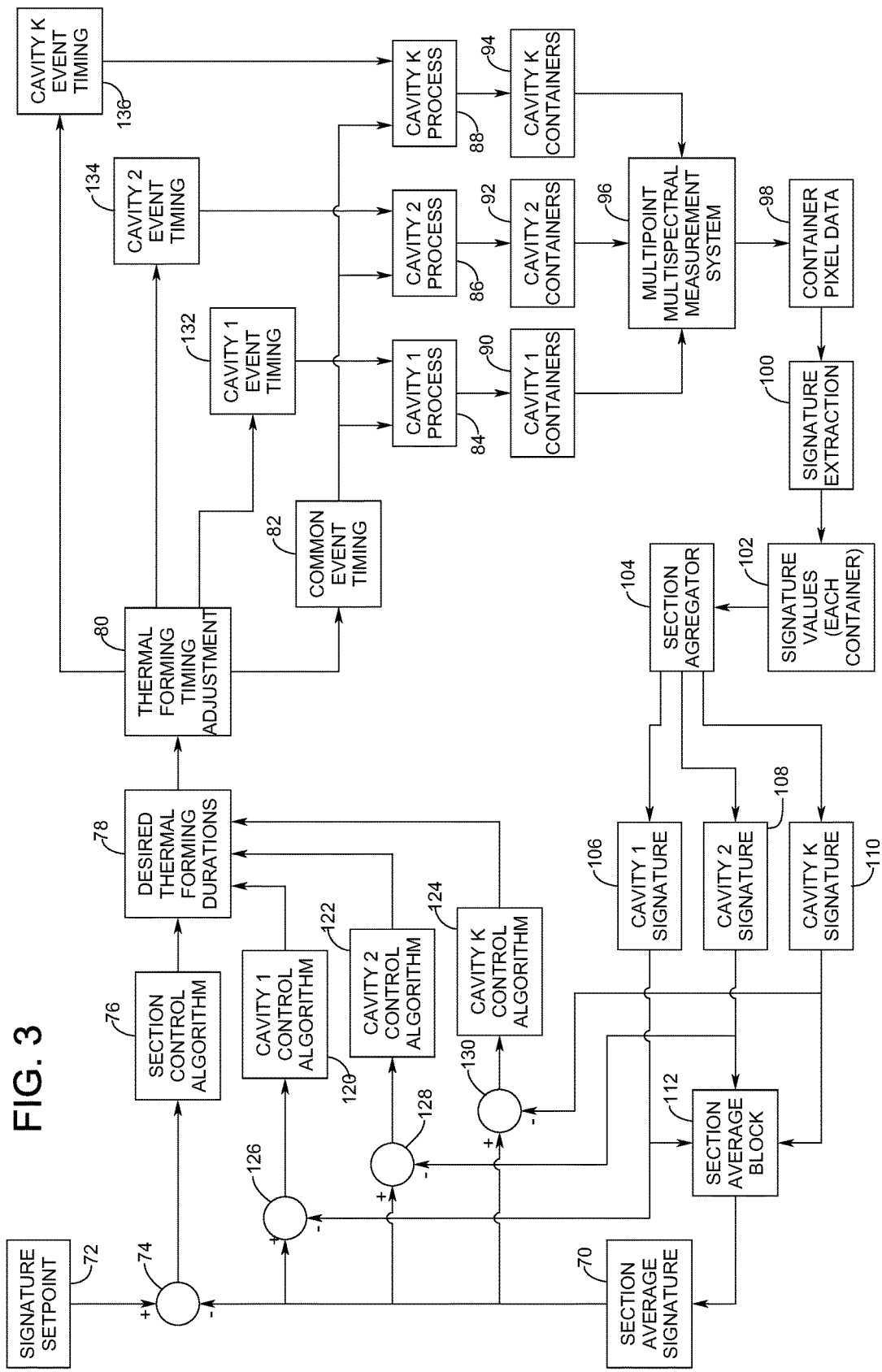
FIG. 3 is a functional schematic depiction of a section average and cavity control closed loop control system implementing a third embodiment of the present invention.

A further elaboration of the basic structure shown in FIG. 2 can be implemented to take advantage of adjustable parameters that are available for individual cavities within a section (as opposed to adjustments that are common to the whole section). One possible implementation for a control structure to provide for automatic adjustment to the parameters that are common to all of the cavities as well as those parameters that are individually adjustable is shown in FIG. 3. Operation of a section average and cavity control system will be described with reference to this figure.

The main section average control loop operates as described with reference to FIG. 2, with the same reference numerals being used on the same components of the system. Additionally, a cascade structure has been added, in which the section average signature 70 provides a setpoint to k individual cavity control algorithms including a cavity 1 control algorithm 120, a cavity 2 control algorithm 122, and a cavity k control algorithm 124. Each of the individual control algorithms then adjusts the cavity specific parameters in order to get the individual cavity to match the section average as closely as possible.

Referring to the cavity 1 control loop, a summer 126 subtracts the cavity 1 signature 106 from the section average signature 70 to produce a resulting section 1 error signal that is fed to the cavity 1 control algorithm 120. Based on this section 1 error signal, the cavity 1 control algorithm 120 computes desired values for the cavity 1 which form an additional part of the desired thermal forming durations 78. Similarly, referring to the cavity 2 control loop, a summer 128 subtracts the cavity 2 signature 108 from the section average signature 70 to produce a resulting section 2 error signal that is fed to the cavity 2 control algorithm 122. Based on this section 2 error signal, the cavity 2 control algorithm 122 computes desired values for the cavity 2 which also form an additional part of the desired thermal forming durations 78. Likewise, referring to the cavity k control loop, a summer 130 subtracts the cavity k signature 110 from the section average signature 70 to produce a resulting section k error signal that is fed to the cavity k control algorithm 124. Based on this section k error signal, the cavity k control algorithm 124 computes desired values for the cavity k which form yet another part of the desired thermal forming durations 78.

The thermal forming timing adjustment system 80 uses the values computed by the cavity 1 control algorithm 120, the cavity 2 control algorithm 122, and the cavity k control algorithm 124, along with the values computed by the section control algorithm 76, to compute all of the event angles for the section. The common event timing values 82 that are common to the entire section are applied to all of the machine cavities (as was the case in the system of FIG. 2). The cavity specific event values, in contrast, are applied only to the specific cavity of the machine. Thus, cavity 1 event values 132 are applied to the cavity 1 process 84, cavity 2 event values 134 are applied to the cavity 2 process 86, and cavity k event values 136 are applied to the cavity k process 88.

This use of cavity specific event values in addition to cavity specific event values results in modification to the formation of the containers from the respective cavities, which after being measured and analyzed by the multipoint, multispectral measurement system 96, the container pixel vectors 98, and the signature extraction block 100 is manifest as a change to the signatures from each cavity. These additional cavity feedback loop operate to provide fine adjustments to each of the cavities.

Detailed Explanation of Key Elements Signature Extraction Block

Two possible implementations of the signature extraction blocks 38, 100 will now be described. The first implementation utilizes a methodology known as principal component analysis ("PCA"). The second implementation utilizes a methodology known as partial least squares regression. In either case, the overall goal is to take a relatively large number of pixel data points and transform them into a much smaller number of essential variables, which are then controlled. The two approaches differ in their criteria for choosing the essential variables. For the principal component analysis approach, the criterion is to capture as much of the variance in the original set of images as possible using a small number of variables. For the partial least squares regression, the criterion is to choose a representation in which the variability in the transformed image data is maximally correlated with the variability in some set of separately measured quality variables (e.g., from cold end inspection data).

Alternative 1—Principal Component Analysis

First, a collection of n container images is gathered. Each container image is represented by a set of m pixel values stored in a length m column vector of pixel values, $x[i]$ where i is the ith container in the collection. An n row by m column matrix X is formed, where the ith row in X is given by $x^T[i]$, where the superscript T denotes the transpose. It is desirable to form a new, smaller set of variables to describe the ith container, which is denoted as the length r vector $t[k]$ with r<m. Thus, rather than requiring m values to describe the image of a hot container, we can use only r values to describe the same container.

Of course, for the technique to be useful, the $t[i]$ values must in some sense contain the important aspects of the images. Specifically, using principal component analysis, the linear combinations of the individual pixel values that have the maximum variance are identified. This captures the key variability in the data in the new variable $t[i]$, which will be referred to here as the signature. The specific computation is performed as follows:

Define the covariance matrix $C_{xx}$ as:

$$C_{xx}=X^TX \quad \text{Equation 1}$$

where X is the n row by m column pixel data matrix, with each row providing the pixel values for an individual container. It is assumed here that the pixel values have been mean centered (the mean value for each pixel has been subtracted off).

Define a new vector t as a linear combination of the columns of x given by:

$$t_1=Xw_1$$

$$\|w\|_2=1 \quad \text{Equation 2}$$

where $w_1$ is a unit vector of weights defining the linear combination of columns of x. We wish to find the values of the weight vector $w_1$, such that the variance of $t_1$ will be as large as possible.

The variance is given by:

$$c_{xx}=t_1^Tt_1 \quad \text{Equation 3}$$

Substituting for t from Equation 2 into Equation 3 gives:

$$c_{xx}=w_1^TX^TXw_1 \quad \text{Equation 4}$$

And substituting for the covariance matrix from Equation 1 gives:

$$c_{xx}=w_1^TC_{xx}w_1 \quad \text{Equation 5}$$

Since $C_{xx}$ is real and symmetric, it can be factored (see for example Strang, Gilbert, *Linear Algebra and Its Applications*, Academic Press, Second Edition 1980) as:

$$C_{xx}=V\Sigma V^T \quad \text{Equation 6}$$

where V=an orthonormal matrix whose columns are eigenvectors of $C_{xx}$, and $\Sigma$=diagonal matrix with eigenvalues of $C_{xx}$ on main diagonal, sorted from largest to smallest.

Combining Equations 5 and 6 gives:

$$c_{xx}=w_1^TV\Sigma V^Tw_1 \quad \text{Equation 7}$$

which will be maximized when w is aligned with the first row of $V^T$ (that is, the first eigenvector of $C_{xx}$) So that:

$$w_1=v_1$$

$$t_1=Xv_1 \quad \text{Equation 8}$$

Similarly, the next largest variance, for any other direction which is orthogonal to $t_1$ will be in given by $w_2$ aligned with the second eigenvector of $C_{xx}$. Continuing with this approach we find that the directions of maximum variance are defined by:

$$T=XV \quad \text{Equation 9}$$

The largest variance will then occur in the directions given by the columns of T with the greatest amount of variability captured in the first column of T, the next greatest in the second column and so on. Thus we can capture a large proportion of the variability in the data, by retaining only the first r<m columns of T. The value of r needed to capture a given proportion of the total variability depends on the degree of correlation in the original data. For the pixel values in the container images, which are highly correlated with neighboring pixels, we can expect that r will be much less than m (For example, for a 256×256 pixel image we would have m=65536 ($256^2$=65536) we might need to retain only the first 10 to 20 columns of t to capture a sufficient proportion of the variability. Defining the reduced set of variables, $T_r$ and $V_r$ given by retaining only the first r columns of T and V, we obtained the transformed variables (known as Principal Components) as:

$$T_r = XV_r \qquad \text{Equation 10}$$

Once the matrix $V_r$ has been computed, it is saved and then used to transform each subsequent new container image $x_{mw}$ to the new transformed vector $t_{new}$ using:

$$t_{new} = V_r^T x_{new} \qquad \text{Equation 11}$$

The length r vector $t_{new}$, with r<m will be referred to as the container signature.

Alternative 2—Partial Least Squares Regression

As in Alternative 1, a collection of n container images is gathered. Each container image is represented by a set of m pixel values stored in a length m column vector of pixel values, x[i] where i is the ith container in the collection. An n row by m column matrix X is then formed where the ith row in X is given by $x^T[i]$. For each of these hot containers, p quality-related variables (e.g. wall thickness, lean, ovality . . . ) are measured which we denote as the length p column vector y[k]. These are collected together in an n row by p column matrix Y, where the ith row in Y is given by $y^T[i]$. (The elements of y are assumed here to already be appropriately scaled or normalized so that deviations in the individual quality variables are comparable and the columns of Y have zero mean)

It is desired to form a new, smaller set of variables to describe the ith container, which is denoted as the length r vector t[k] with r<m. Thus, rather than requiring m values to describe the image of a container, only r values may be used instead. Of course, for the technique to be useful, the t[i] values must, in some sense, contain the important aspects of the images. Specifically, using partial least squares regression, the linear combinations of the individual pixel values that have the maximum covariance with the quality variables are identified. Intuitively, the aspect of the variability in the images that is most closely related to the variability in the quality is sought, which is the most important matter. The specific computation may be performed as follows.

The Cross Covariance matrix, $C_{yx}$ is defined as:

$$C_{yx} = Y^T X \qquad \text{Equation 12}$$

The directions of maximum covariance between the input (image data) and output (quality data) are being sought. Two particular input and output vectors, p and q, are defined as:

$$p = Yf$$

$$q = Xg$$

$$\|f\|_2 = \|g\|_2 = 1 \qquad \text{Equation 13}$$

so that p is a linear combination of the columns of Y and q is a linear combination of the columns of X.

The covariance $c_{pq}$ between p and q is given by:

$$c_{pq} = p^T q \qquad \text{Equation 14}$$

Substituting for p and q from Equation 13 into Equation 14 gives:

$$c_{pq} = f^T Y^T X g \qquad \text{Equation 15}$$

Substituting for the cross covariance matrix $C_{yx}$ from Equation 12 into Equation 15 gives:

$$c_{pq} = f^T C_{yx} g \qquad \text{Equation 16}$$

values f* and g* to maximize $c_{pq}$ are being sought.
Let:

$$r^* = C_{yx} g^* \qquad \text{Equation 17}$$

So from Equations 16 and Equations 17:

$$c_{pq} = f^T r^* \qquad \text{Equation 18}$$

Since f is a unit vector, $C_{pq}$ will be maximized when f and r* are collinear. Therefore, define f* as:

$$f^* = \frac{r^*}{\sqrt{r^{*T} r^*}} \qquad \text{Equation 19}$$

Substituting into Equation 18, the maximal value of the covariance $c_{pq}^*$ is given by:

$$c_{pq}^* = \sqrt{r^{*T} r^*} \qquad \text{Equation 20}$$

where the term on the right hand side of Equation 20 is the magnitude (Euclidean length) of r*. Thus, to maximize the cross correlation we would like the magnitude of r* to be as large as possible. It is thus necessary to find a g* to maximize the magnitude of r*.

This can be found by using the singular value decomposition (see Strang, Gilbert, *Linear Algebra and Its Applications*, Academic Press, Second Edition 1980) to factor $C_{yx}$ as:

$$C_{yx} = WSV^T \qquad \text{Equation 21}$$

where W=N×N unitary matrix ($W^T W = I$, where I is the identity matrix) of left singular vectors, S=N×M diagonal matrix of singular values in decreasing order, and V=M×M unitary matrix ($V^T V = I$) of right singular vectors.

The internal structure of S is given by:

$$S = \begin{bmatrix} \sigma_1 & 0 & 0 & 0 \\ 0 & \sigma_2 & 0 & 0 \\ 0 & 0 & \ddots & 0 \\ 0 & 0 & 0 & \sigma_M \\ 0 & 0 & 0 & 0 \\ 0 & 0 & 0 & 0 \end{bmatrix}$$

with $\sigma_1 \geq \sigma_2 \geq \sigma_i \geq \ldots \geq \sigma_M$

Substituting for $C_{yx}$ from Equation 21 into Equation 17 gives:

$$r^* = WSV^T g^* \qquad \text{Equation 22}$$

From the structure of the singular value decomposition, it can be seen that the maximum amplification (the largest r* will occur for $g_1^* = v_1$, the first column of V. The corresponding r, and therefore, f, will be aligned with the first column (singular vector) of W. Similarly, the next largest covariance, for any other direction which is orthogonal to $p_1 = Xg_1$ will be in given by $g_2$ aligned with the second column of $C_{yx}$. Continuing with this approach, it is found that the directions of maximum covariance are defined by the transformed variables:

$$T = XV$$

$$U = YW \qquad \text{Equation 23}$$

To obtain a reduced dimension signature, we retain only the first r singular vectors and singular values with r<m. That is we define $V_r$ and $W_r$ as the first r columns of V and W respectively. Once $V_r$ are obtained, they are saved and new values of the signature vector $t_{new}$ are computed from new image vectors $x_{new}$ using:

$$t_{new} = V_r^T x_{new} \qquad \text{Equation 24}$$

It is also possible to advantageously obtain an immediate prediction of the quality variables (which normally isn't available until after the hot containers pass through the Lehr to the cold end inspection, which may be from 30-60 minutes) by regressing the transformed quality variables U as a function of the transformed input variables T.

Specifically, we use ordinary least squares regression (see Strang, Gilbert, *Linear Algebra and Its Applications*, Academic Press, Second Edition 1980) to find a matrix of coefficient values B to minimize the error $\epsilon$:

$$U_r = TB + \epsilon \qquad \text{Equation 25}$$

Once the matrix B is obtained, new values of the transformed quality variables are obtained from:

$$u_{new} = B^T t_{new} \qquad \text{Equation 26}$$

We also have from the definition of $W_r$:

$$y_{new} = W_r u_{new} \qquad \text{Equation 27}$$

Substituting in Equation 27 for $u_{mw}$ from Equation 26 and for $t_{new}$ from Equation 24 gives an overall expression for computing the predicted quality variables from the input image vector:

$$y_{new} = W_r B^T V_r^T x_{new} \qquad \text{Equation 28}$$

The resulting prediction of the quality variables from Equation 28 may be either displayed to the user to provide a monitoring function, or it can be used as a feedback signal in a closed loop control system. The latter use of a computed measurement as a feedback control is commonly referred to as a "soft sensor" (shortened from software sensor).

Closed Loop Controller

Once the container signature signal is obtained (for example using principal component analysis or partial least squares as described above), it may be fed back to a closed loop controller. The responsibility of the closed loop controller is to automatically adjust the process so as to maintain the signature at some desired value (setpoint). Typically, this desired value of the signature will be obtained by first identifying some exemplar set of containers that are considered good. The average signature value for these containers may be calculated and then used as the setpoint. There are many possible control algorithms that could be used to perform the actual closed loop adjustment. In general, any such algorithm must address the multivariable nature of the control problem, in which $N_u$ different forming durations are adjusted to control the r elements of the signature vector.

Figure 4:
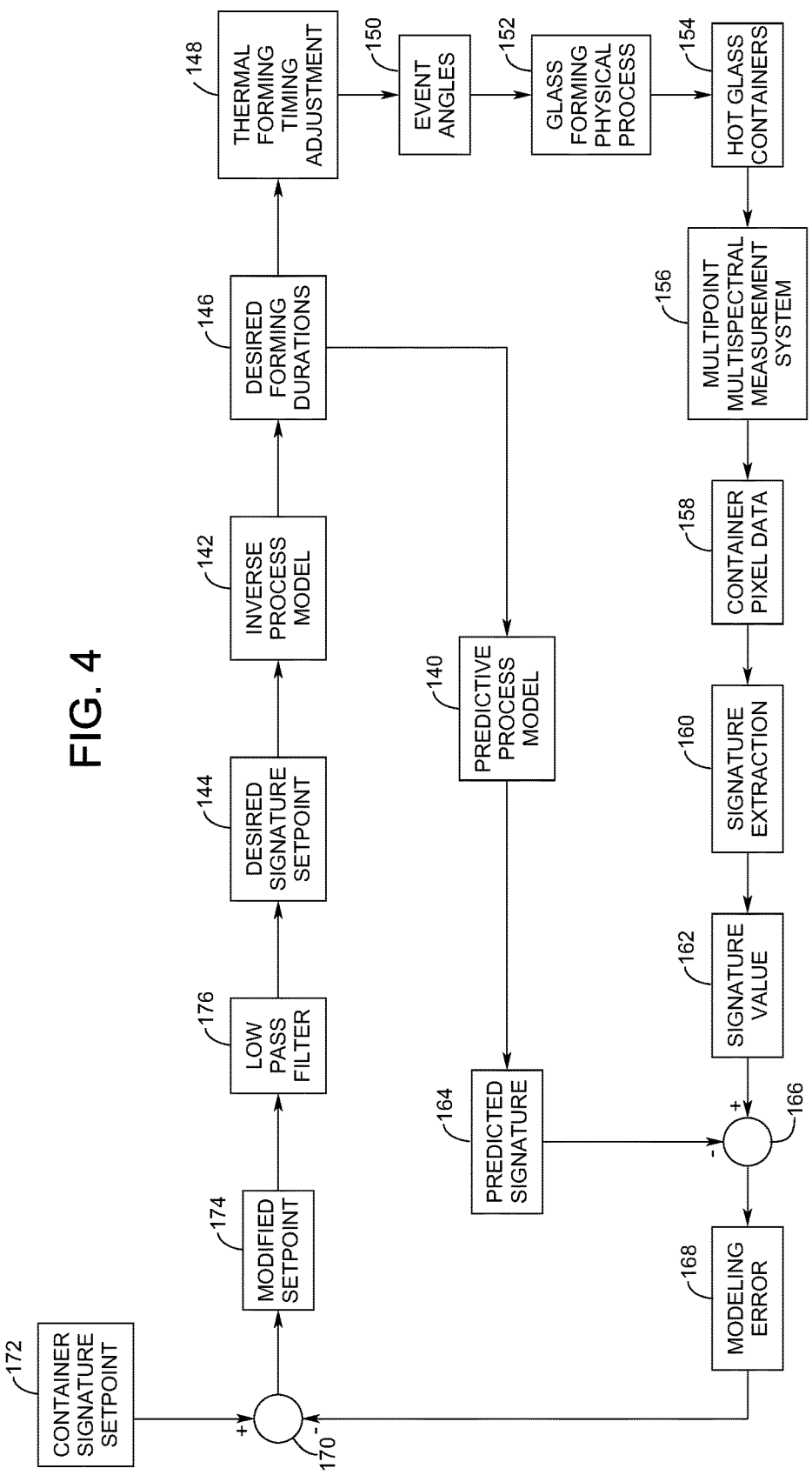
FIG. 4 is a functional schematic depiction of an internal control closed loop control system implementing a fourth embodiment of the present invention.

To perform the actual closed loop adjustment, an internal model based control system such as the exemplary control system shown schematically in FIG. 4 may be used. This system follows the internal model control paradigm (as it is called in the control system literature), and utilizes both a predictive process model 140 and an inverse process model 142. The predictive process model 140 is used to compute the expected reaction of the container signature to a change in the forming durations. The inverse process model 142 computes a set of forming durations which, when applied to the system, will provide an approximation of the desired signature.

The closed loop control shown in FIG. 4 operates as follows. Desired signature setpoints 144 are input to the inverse process model 142. The inverse process model 142 then computes a set of desired forming durations 146 that should approximately achieve the desired signature values. The desired forming durations 146 are then provided to a thermal forming timing adjustment system 148, which transforms the desired forming durations 146 into event timing ON/OFF angle values 150 using for example using the cycle optimizer technology as discussed within U.S. Pat. Nos. 7,489,983, 6,722,158, 6,711,916, 6,705,120, 6,705,119, 6,606,886, 6,604,386, 6,604,385, 6,604,384, and 6,604,383, which are all assigned to the assignee of the present patent application, and which were incorporated herein by reference above.

The event timing ON/OFF angle values 150 are then applied to a glass forming physical process 152. This results in hot containers 154 leaving the glass forming physical process 152 with a particular thermal state and glass distribution which is then measured by a multipoint, multispectral measurement system 156. As was the case in the systems shown in FIGS. 1-3, the multipoint, multispectral measurement system 96 shown in FIG. 2 may be as described in European Patent Application Publication No. EP 2 336 740 A1, U.S. Pat. No. 8,462,203, and U.S. Patent Application Publication No. US 2011 0141265 A1, all of which were incorporated herein by reference in their entirety above.

The multipoint, multispectral measurement system 156 produces a container pixel vector 158 for each hot container 154 which it sends to a signature extraction block 160. The signature extraction block 160 provides a dimensional reduction to produce a signature value 162 for each hot container 154 using, for example, the principal component analysis or partial least squares algorithms discussed above. The desired forming durations 146 are also applied to the predictive process model 140, which computes predicted signatures 164 of the hot containers 154. The predicted signature 164 is subtracted from the signature value 162 in a summer 166, producing a modeling error signal 168.

If the model of the process was perfect, the modeling error signal 168 would be zero. However, due to numerous actual factors which cannot be perfectly taken into account, the modeling error signal 168 will generally be nonzero. To account for the modeling error signal 168, a summer 170 subtracts the modeling error signal 168 from a container signature setpoint 172, producing a modified setpoint 174. It may be understood that if, due to the modeling error signal 168, the current value of the container signature setpoint 172 produces too great a response, then the container signature setpoint 172 may be modified accordingly to ask for a smaller response, or vice versa.

To provide robustness against high frequency modeling errors, and to avoid reaction to spurious high frequency noise, the modified setpoint 174 is passed through a low pass filter 176, for example a rolling average value, to produce the filtered, modified desired signature setpoint 144, thus completing the control loop. For an overall machine control system, multiple internal model controllers each with the same general structure, and operation as described herein with reference to FIG. 4, would be implemented. There would preferably at least be one internal model controller per section to regulate the section average signature. If individual cavity level adjustments are used, as was the case in the system described with reference to FIG. 3, then for each section there would be additional internal model controllers assigned to controlling the cavity signatures as well.

Internal Model

A preferred embodiment of the system shown in FIG. 4, would utilize a linear, perturbation model of the forming process in which we have:

$$z = Pu \qquad \text{Equation 29}$$

where z is a vector of signature perturbations, P is a matrix of sensitivity coefficients, and u is a vector of forming parameter (duration) adjustments.

The matrix P could be determined empirically by performing a set of tests on an actual section, in which the input parameters u are varied and the resulting perturbations z are recorded. Alternatively, if a sufficiently accurate simulation model was available, the "experiments" could be performed numerically using the simulation model to obtain a linearized model. In either case, using regression techniques, the resulting data could be fit to an equation of the form of Equation 29. The inverse model could then be obtained using the Moore-Penrose pseudoinverse (Penrose, Roger, *A Generalized Inverse for Matrices*, Proceedings of the Cambridge Philosophical Society 51:406-413, 1955). So that:

$$u = P^+ z \qquad \text{Equation 30}$$

where u and z are as in Equation 28 and P+ is the Moore-Penrose pseudoinverse. The properties of the Moore-Penrose pseudoinverse are particularly suited to this application.

If the number of available input adjustments (elements of the vector u) is less than the number of signature coordinates then in general it will not be possible to achieve an arbitrary set of signature element values. The formulation in Equation 30 would provide the set of inputs u that would provide an output z that was as close as possible (in a least square error sense) to the desired values. Alternatively, if there are more adjustable parameters then signature elements, then there are multiple possible solutions (multiple values of u). In this case, the Moore-Penrose pseudoinverse has the desirable property of providing the set of inputs u with the smallest magnitude.

Figure 5:
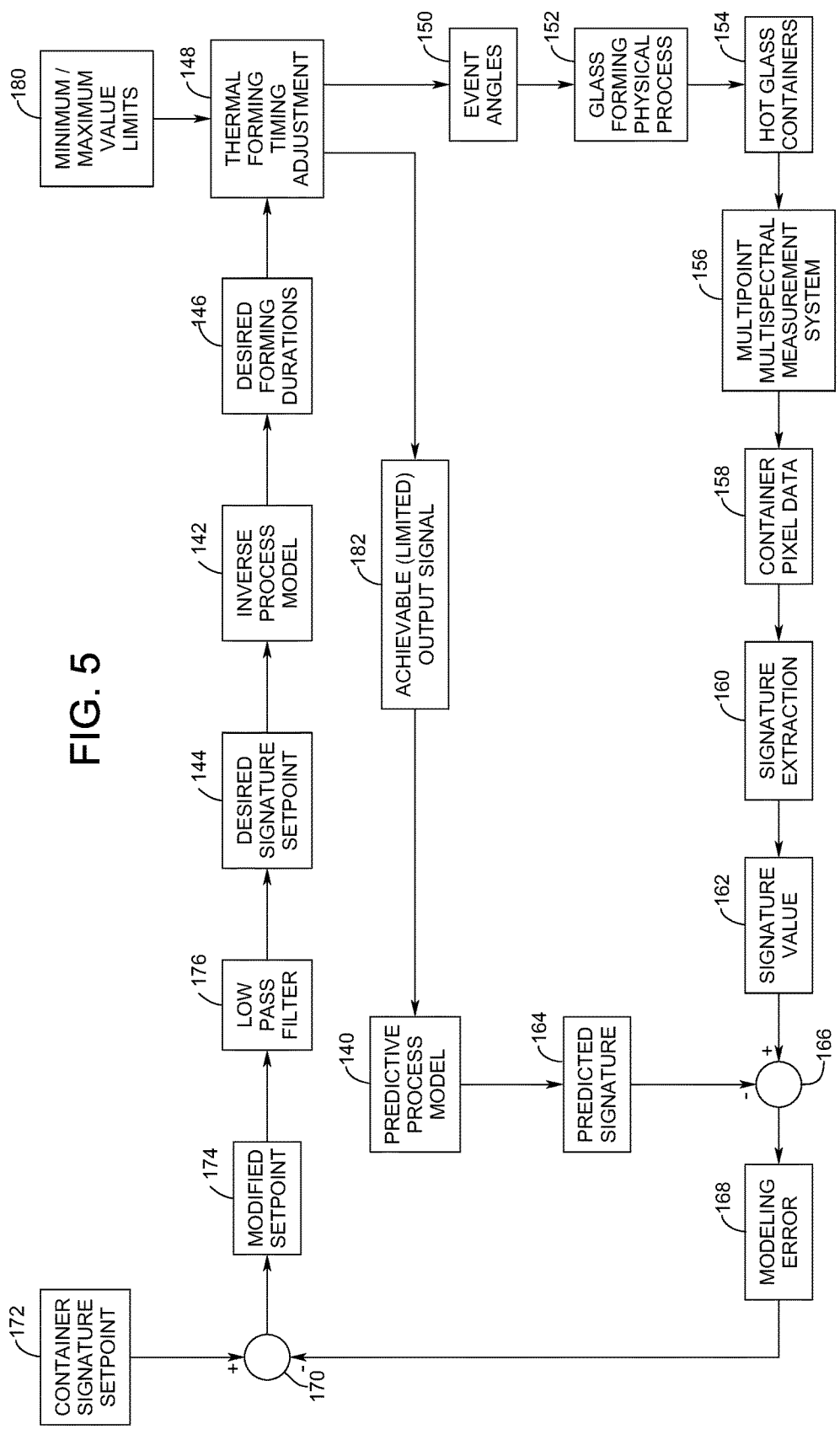
FIG. 5 is a functional schematic depiction of an internal model control closed loop control system implementing a fifth embodiment of the present invention.

In any practical implementation of the above approach, it will be recognized that the process parameter adjustments cannot be arbitrarily large, and thus appropriate limits have to be applied. One approach to providing such limits is shown in FIG. 5, in which an internal model control with limits operates as described with reference to FIG. 4, with the same reference numerals being used on the same components of the system.

Additionally, a minimum/maximum value limits block 180 has been added which provides the allowed minimum or maximum value to the thermal forming timing adjustment system 148, which then provides an achievable (limited) output signal 182 to the predictive process model 140. Note that since the same limited output is applied as the event timing ON/OFF angle values 150 to the glass forming physical process 152 and as the achievable (limited) output signal 182 to the predictive process model 140, the predictive process model 140 "knows" that the achievable (limited) output signal 182 is clipped, and the clipping of the achievable (limited) output signal 182 does not result in creating any additional modeling error.

Although the foregoing description of the present invention has been shown and described with reference to particular embodiments and applications thereof, it has been presented for purposes of illustration and description and is not intended to be exhaustive or to limit the invention to the particular embodiments and applications disclosed. It will be apparent to those having ordinary skill in the art that a number of changes, modifications, variations, or alterations to the invention as described herein may be made, none of which depart from the spirit or scope of the present invention. The particular embodiments and applications were chosen and described to provide the best illustration of the principles of the invention and its practical application to thereby enable one of ordinary skill in the art to utilize the invention in various embodiments and with various modifications as are suited to the particular use contemplated. All such changes, modifications, variations, and alterations should therefore be seen as being within the scope of the present invention as determined by the appended claims when interpreted in accordance with the breadth to which they are fairly, legally, and equitably entitled.

While the current application recites particular combinations of features in the claims appended hereto, various embodiments of the invention relate to any combination of any of the features described herein whether or not such combination is currently claimed, and any such combination of features may be claimed in this or future applications. Any of the features, elements, or components of any of the exemplary embodiments discussed above may be claimed alone or in combination with any of the features, elements, or components of any of the other embodiments discussed above.

What is claimed is:

1. A system for automatically adjusting the event timing of operations in cavities of a section of an I.S. machine, comprising:
   a multipoint, multispectral glass container measurement system that provides container pixel data information indicative of certain measurements of hot glass containers manufactured by the I.S. machine;
   a signature extraction block that mathematically transforms container pixel data information into a reduced dimensional measured signature;
   a controller for producing event timing signals to operate the cavities of the section of the I.S. machine in response to the measured signature and a preferred target signature to automatically adjust the event timing of operations in the cavities of the section of the I.S. machine to diminish variations in the measured signature;
   wherein the signature extraction block is arranged to produce reduced dimensional measured signatures for each of the cavities in the section of the I.S. machine, and wherein said system additionally comprises a section averaging block that is arranged to average the reduced dimensional measured signatures for each of the cavities in the section of the I.S. machine to produce a section average measured signature that is provided to the controller;
   wherein, in addition to the section average measured signature being provided to the controller, system is arranged to provide the reduced dimensional measured signatures for each of the cavities in the section of the I.S. machine to the controller; and
   wherein the controller is arranged to provide both common event timing signals to all of the sections of the I.S. machine based upon the section average measured signature as well as unique cavity event timing signals based upon the measured signatures for each of the cavities in the section of the I.S. machine to each of the sections of the I.S. machine.

2. The system as defined in claim 1, wherein the glass container measurement system is arranged and configured to monitor radiation emitted by hot glass containers after they are formed and before they are cooled as they are conveyed away from the I.S. machine.

3. The system as defined in claim 2, wherein the glass container measurement system comprises:
   at least one imaging device for monitoring radiation emitted by hot glass containers after they are formed and as they are conveyed away from the I.S. machine.

4. The system as defined in claim 1, wherein the signature extraction block uses Principle Component Analysis to mathematically transform container pixel data information into the reduced dimensional measured signature.

5. The system as defined in claim 1, wherein the signature extraction block uses Partial Least Squares regression to mathematically transform container pixel data information into the reduced dimensional measured signature.

6. The system as defined in claim 1, wherein the event timing signals produced by the controller comprise desired thermal forming durations including at least mold contact time, stretch time, and blank contact time.

7. The system as defined in claim 1, wherein the controller is arranged to limit the event timing signals by adjustable limit values.

8. The system as defined in claim 1, wherein the controller comprises:
an inverse process model module arranged to produce a set of forming durations in response to a desired signature setpoint which forming durations are the basis of the event timing of operations applied to the cavities of the section of the I.S. machine which will provide an approximation of the desired signature setpoint; and
a predictive process model module arranged to compute a predicted signature which is the calculated response of the measured signature to a change in the forming durations;
wherein the controller is arranged to subtract the predicted signature from the measured signature to produce a modeling error signal; and
wherein the controller is arranged to subtract the modeling signal from the preferred target signature to produce a modified setpoint which is the basis for the desired signature setpoint.

9. The system as defined in claim 8, additionally comprising:
a low pass filter that filters the modified setpoint to produce the desired signature setpoint.

10. The system as defined in claim 8, additionally comprising:
a thermal forming timing adjustment system providing the event timing of operations applied to the cavities of the section of the I.S. machine in response to the forming durations produced by the inverse process model module.

11. The system as defined in claim 10, additionally comprising:
a minimum/maximum value limits block arranged to provide allowed minimum or maximum values to the thermal forming timing adjustment system; wherein the thermal forming timing adjustment system is arranged to provide an achievable (limited) output signal to the predictive process model.

12. A system for automatically adjusting the event timing of operations in cavities of a section of an I.S. machine, comprising:
a multipoint, multispectral glass container measurement system that is arranged to monitor radiation emitted by hot glass containers after they are formed and before they are cooled as they are conveyed away from the I.S. machine, wherein the container measurement system provides container pixel data information indicative of certain measurements of hot glass containers manufactured by the I.S. machine;
a signature extraction block that mathematically transforms container pixel data information into a reduced dimensional measured signature;
an element for providing a preferred target signature known to have previously provided desirable hot glass containers;
a controller for producing event timing signals to operate the cavities of the section of the I.S. machine in response to the measured signature and a preferred target signature to automatically adjust the event timing of operations in the cavities of the section of the I.S. machine to diminish variations in the measured signature;
wherein the signature extraction block is arranged to produce reduced dimensional measured signatures for each of the cavities in the section of the I.S. machine, and wherein said system additionally comprises a section averaging block that is arranged to average the reduced dimensional measured signatures for each of the cavities in the section of the I.S. machine to produce a section average measured signature that is provided to the controller;
wherein, in addition to the section average measured signature being provided to the controller, the system is arranged to provide the reduced dimensional measured signatures for each of the cavities in the section of the I.S. machine to the controller; and
wherein the controller is arranged to provide both common event timing signals to all of the sections of the I.S. machine based upon the section average measured signature as well as unique cavity event timing signals based upon the measured signatures for each of the cavities in the section of the I.S. machine to each of the sections of the I.S. machine.

13. A method of automatically adjusting the event timing of operations in the cavities of a section of an I.S. machine, comprising:
providing container pixel data information indicative of certain measurements of hot glass containers manufactured by the I.S. machine with a multipoint, multispectral glass container measurement system;
mathematically transforming container pixel data information into a reduced dimensional measured signature; and
producing event timing signals to operate the cavities of the section of the I.S. machine in response to the measured signature and a preferred target signature to automatically adjust the event timing of operations in the cavities of the section of the I.S. machine to diminish variations in the measured signature; wherein the mathematically transforming step comprises producing reduced dimensional measured signatures for each of the cavities in the section of the I.S. machine and averaging the reduced dimensional measured signatures for each of the cavities in the section of the I.S. machine to produce a section average measured signature;
providing the reduced dimensional measured signatures for each of the cavities in the section of the I.S. machine to the controller; and
providing both common event timing signals to all of the sections of the I.S. machine based upon the section average measured signature as well as unique cavity event timing signals based upon the measured signatures for each of the cavities in the section of the I.S. machine to each of the sections of the I.S. machine.

14. The method as defined in claim 13, wherein the providing container pixel data information step comprises:
monitoring radiation emitted by hot glass containers with at least one imaging device.

15. The method as defined in claim 13, wherein the mathematically transforming step comprises either using Principle Component Analysis to mathematically transform container pixel data information into the reduced dimensional measured signature or using Partial Least Squares regression to mathematically transform container pixel data information into the reduced dimensional measured signature.

16. The method as defined in claim 13, additionally comprising:
   limiting the event timing signals by adjustable limit values.

17. The method as defined in claim 13, additionally comprising:
   producing a set of forming durations in response to a desired signature setpoint which forming durations are the basis of the event timing of operations applied to the cavities of the section of the I.S. machine which will provide an approximation of the desired signature setpoint;
   computing a predicted signature which is the calculated response of the measured signature to a change in the forming durations;
   subtracting the predicted signature from the measured signature to produce a modeling error signal; and
   subtracting the modeling signal from the preferred target signature to produce a modified setpoint which is the basis for the desired signature setpoint.

* * * * *